US007873028B2

(12) United States Patent
Lam et al.

(10) Patent No.: US 7,873,028 B2
(45) Date of Patent: Jan. 18, 2011

(54) METHOD AND APPARATUS FOR A FLEXIBLE PERIPHERAL ACCESS ROUTER

(75) Inventors: Barry Lam, Tao Yuan Shien (TW); Chia-Yuan Chang, Chia-Yi (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 1261 days.

(21) Appl. No.: 10/254,498

(22) Filed: Sep. 24, 2002

(65) Prior Publication Data

US 2003/0142683 A1 Jul. 31, 2003

Related U.S. Application Data

(60) Provisional application No. 60/352,122, filed on Jan. 25, 2002.

(51) Int. Cl.
*H04L 12/66* (2006.01)
(52) U.S. Cl. ...................................... 370/352
(58) Field of Classification Search ........................ None
See application file for complete search history.

(56) References Cited

U.S. PATENT DOCUMENTS

| 6,621,820 | B1* | 9/2003 | Williams et al. | ....... 370/395.31 |
|---|---|---|---|---|
| 2001/0009424 | A1 | 7/2001 | Sekiguchi | |
| 2001/0030950 | A1* | 10/2001 | Chen et al. | .................. 370/329 |
| 2001/0033554 | A1* | 10/2001 | Ayyagari et al. | ............ 370/328 |
| 2001/0036192 | A1* | 11/2001 | Chiles et al. | ................ 370/401 |
| 2001/0054060 | A1* | 12/2001 | Fillebrown et al. | .......... 709/201 |
| 2003/0055962 | A1* | 3/2003 | Freund et al. | ................ 709/225 |
| 2003/0090501 | A1* | 5/2003 | Anderson et al. | ........... 345/700 |

FOREIGN PATENT DOCUMENTS

JP 2001202317 A 7/2001

OTHER PUBLICATIONS

J.A. Sanchez-P., et al., "A High Performance, Versatile Residential Gateway," WCNC. IEEE Wireless Communications and Networking Conference, XX,XX, (Sep. 23, 2000), pp. 560-564, XP002171573.
Corcoran P.M., "Mapping Home-Network Applicances to TCP/IP Sockets Using a Three-Tiered Home Gateway Architecture", IEEE Transactions on Consumer Electronics, IEEE Inc., NY, US, vol. 44, No. 3 (Aug. 1998), pp. 729-736, XP000851577.

* cited by examiner

*Primary Examiner*—Raj K Jain
(74) *Attorney, Agent, or Firm*—TIPS Group

(57) ABSTRACT

The present invention provides a method for a local area network router, that allows communication between a number of remotely located users, and a plurality of peripheral devices connected to the local area network router. Users may access the local area network using wireless devices or the Internet. The peripheral devices, which may include a wide variety of multi-media storage, playback, printing, or other functions, are connected to the router via local interfaces, which communicate with the peripheral devices via established protocols. Each of the peripheral devices is provided with an IP address, which facilitates direct communication of the users with the peripheral devices and permits direct communication with the devices over the Internet. Data packets destined for the IP address of a peripheral device are router through the local interface, which converts the data utilizing compatible communication protocols for the target peripheral device.

17 Claims, 12 Drawing Sheets

METHOD AND APPARATUS FOR A FLEXIBLE PERIPHERAL ACCESS ROUTER

CROSS REFERENCE TO RELATED APPLICATIONS

This application claims the benefit of co-pending U.S. Patent Provisional Application No. 60/352,122 filed on Jan. 25, 2002, and is incorporated herein by reference.

BACKGROUND OF THE INVENTION

1. Field of the Invention

The invention relates to methods and apparatus for providing multi-user access to devices and the Internet.

2. Description of the Related Art

It is increasingly desirable to couple computer and digital devices together and to the Internet using TCP/IP protocols. One instance of this is multiple computers provided with radio modems providing wireless communication. Wireless communication between users and a network provides some significant advantages over the similar communication networks utilizing completely hardwired connections. Since there are no permanent wires or cables connecting users to a hub or router in the network, the costs of installing wire and cable are eliminated, as are any costs associated with expanding or changing the office or workplace facility in the future. Wireless solutions also provide mobility for users who must take their PC to various locations on the job site and cannot be tied to a single, non-mobile workstation.

Currently, wireless communication between users and a network may take place via a wireless network access point. This access point is simply an adapter device that converts the incoming radio communications from users' PCs to signals understood by a network, and gives the remote PC users access to all devices connected (hard wired) to the network beyond the access point. This concept is illustrated in FIG. 1A of the prior art. Users may have portable 10A or desktop 10B PCs equipped with wireless modems. These modems transmit to and receive from wireless access point 12 which has a single ethernet connection 14 to a local area network 16. This access point 12 is a dedicated hardware device specifically designed to provide multi-user wireless communication with a single ethernet LAN connection.

Once a user is connected to the LAN 16, they would have access to a number of peripheral devices such as printers, network hard drives, scanners, cable modems, telephone modems, etc. But all of these devices normally require a second interface to connect to the LAN. For example, a printer connected to the network would require an interface device that has an ethernet connection input (from the LAN) and a standard UART (universal asynchronous receiver transmitter) driven LPT (line printer terminal) parallel port (to be connected to the printer). In addition, the LAN usually requires various servers and switching hubs designed to identify and route traffic to end target devices.

FIG. 1B (prior art) illustrates a similar system marketed by Compex, that allows a standard PC 18 to be converted to an access point for an ethernet based LAN 16. A "kit" provided by the manufacturer includes a wireless transceiver pair; one for a user's PC 10A or 10B, and a mating compatible PCI bus interface circuit card that is installed in PC 18. Also included in the "kit" is software that enables the network communication between user's PC 10 and LAN 16. Connection to peripheral devices attached to LAN 16 would have to be made through LAN 16. Connection to peripheral devices attached to the LAN 16 would have to be made through interface adapters, as discussed previously.

FIG. 1C (prior art) illustrates another current product manufactured by companies like Lucent, 3Com, and Cisco Systems. A wireless residential gateway 20 provides an access point for an ethernet 14 based LAN 16, along with a standard V.90 modem connection 22 that can communicate via standard telephone lines 14, and RS232 serial port connections 26. This device provides connectivity to other communication technologies besides a LAN, but access to any peripheral device attached to the RS232 serial port 26, for example, will still require another piece of hardware or additional components to connect to the widest variety of devices, since most will not provide compatible connectivity via a serial port.

FIG. 1D (prior art) illustrates a product that provides wireless communication between users 10 and a USB (universal serial bus) based network. A wireless USB adapter 28 can be connected to a USB hub 30, which in turn is connected to multiple USB devices 32. Currently, a wide variety of USB devices exists such as scanners, DVD/CD readers/writers, removable storage, and printers. But not all devices are compatible with USB systems, and USB is not desirable for high speed data transfers, as might be required for hard disk drives or full color scanners.

FIG. 1E (prior art) illustrates a product that provides wireless communication to a cable modem or DSL (digital subscriber line) connection. Wireless base station and cable router 34 is connected to cable ort DSL line 36, and is designed exclusively for this purpose. Other types of peripherals cannot be executed.

FIG. 1F (prior art) illustrates a product that provides wireless communication between users 10 and a IEEE 1394 (Fire Wire) based network. A wireless IEEE 1394 adapter 200 can be connected to a IEEE 1394 hub 210, which in turn is connected to multiple IEEE 1394 devices 220. A wide variety of IEEE 1394 devices are available such as scanners, DVD/CD readers/writers, removable storage, and printers. But not all devices are compatible with IEEE 1394 systems, and IEEE 1394 is not a cost-effective solution when a high transfer rate is not required, such as when connecting a keyboard and a mouse to a computer.

As illustrated in the examples cited above, a wireless PC user has a large number of adapters to purchase if they want to connect to a multiplicity of devices. They can connect to a multiplicity of devices. They can purchase discrete adapters to connect directly to each end use device (such as a printer or scanner), or purchase a single access point adapter to connect to a LAN, then a number of discrete adapters to connect the end use devices to the LAN. While the current methodologies offer the highest degree of flexibility in configuring the system, it is at a penalty of high cost and significant complexity. The complexity aspect is also reflected in the software needed to run such a network, especially if numerous adapters from a number of different manufacturers are present.

It would be of further interest to have users, connected to the Internet, to also have access to a multiplicity of multimedia peripheral devices, without the expense and complexity of an ethernet based LAN system equipped with discrete adapters to support a multiplicity of peripheral device protocols.

What is needed is an apparatus and method that allows multiple users to connect via wireless modems and the Internet to a single multiple access router, which enables the shared communication with a number of multi-media and peripheral devices.

SUMMARY OF THE INVENTION

The present invention provides a method and apparatus for a local network router, also referred to as a peripheral access router, that allows communication between a number of remotely located users, and a plurality of peripheral devices connected to the local area network router. Users may access the local area network router using wireless devices or the Internet. The peripheral devices, which may include a wide variety of multi-media storage, playback, printing, or other functions, are connected to the router via local interfaces. Each of the peripheral devices is provided with an IP address, which facilitates direct communication of the users with the peripheral devices and permits direct communication with the devices over the Internet.

A local area network router, in accordance with the present invention, includes a central processing apparatus, a plurality of peripheral devices coupled to the central processing apparatus, each provided with an IP address, and an interface coupled to the central processing device to provide Internet connectivity to said peripheral devices.

A local area network router, in accordance with another embodiment of the present invention, further includes a plurality of peripheral devices coupled to at least one of a plurality of local interfaces, the local interfaces being coupled to the central processing apparatus, wherein the peripheral devices communicate with the local interfaces using peripheral interface protocols.

The local interfaces, in accordance with the present invention, are connected to the peripheral devices such as: a digital or video camera, a printer, a scanner, a copier, a hard drive, a CD-ROM drive, a DVD drive/player, a removable media storage drive, a streaming tape drive, an Ethernet hub or router, a telephone, a modem, a game controller, or a USB hub.

The present invention further includes a method for a local area network router which detect a data pocket en route from an originating IP address to a destination IP address, sends the data pocket to a wide area network if the destination IP address is not on a list of local IP addresses, and sends the data packet to a local interface coupled to a peripheral device having the destination IP address if the destination address is on the lost of local addresses. Preferably, the method further illustrates the data packet into an appropriate protocol for a peripheral coupled to the local interface.

DETAILED DESCRIPTION OF THE PREFERRED EMBODIMENT(S)

FIGS. 1A-1F were discussed with reference to various prior art systems.

Figure 1A:
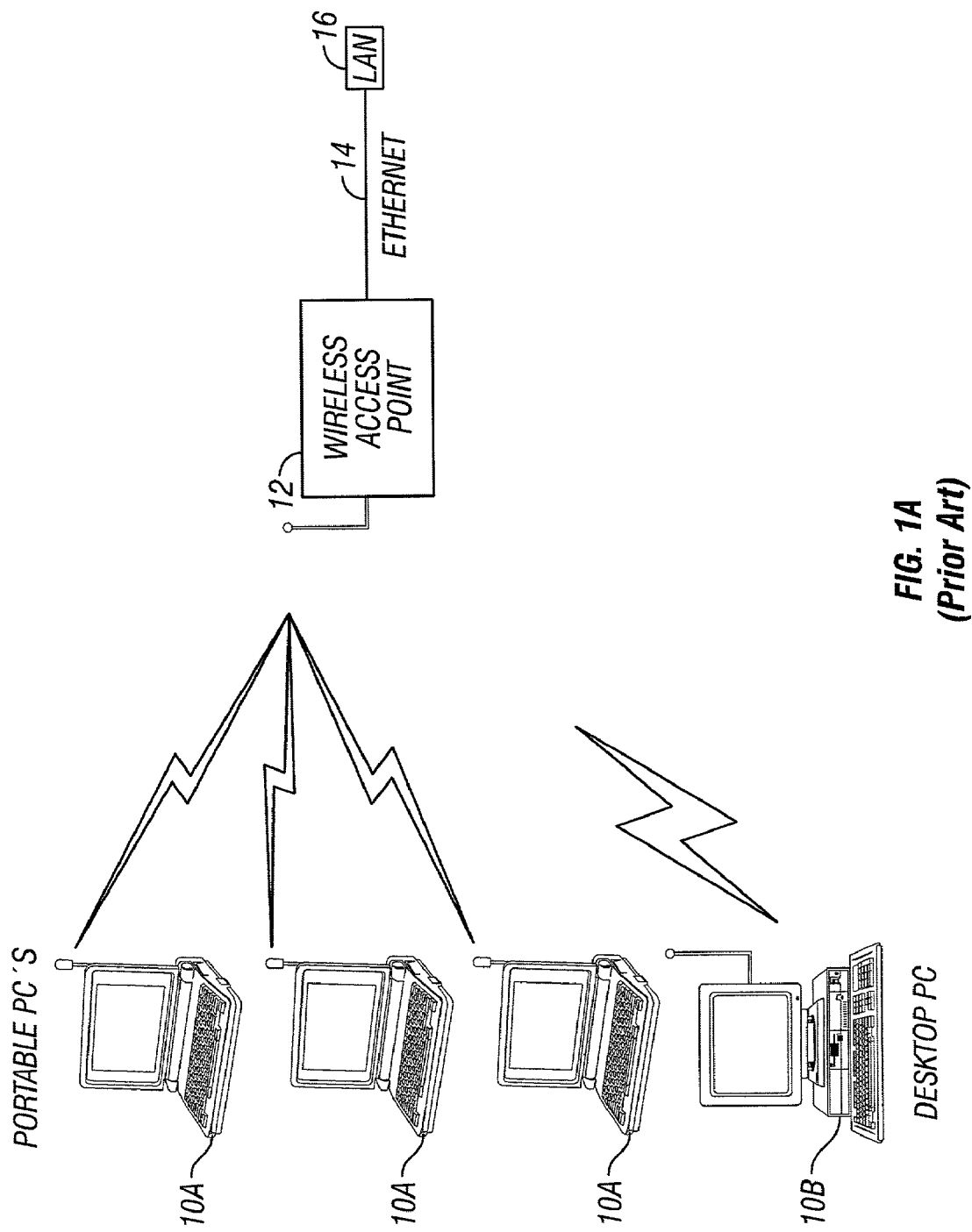
FIG. 1A (prior art) illustrates communication with a prior art wireless access point to a LAN network.
Figure 1B:
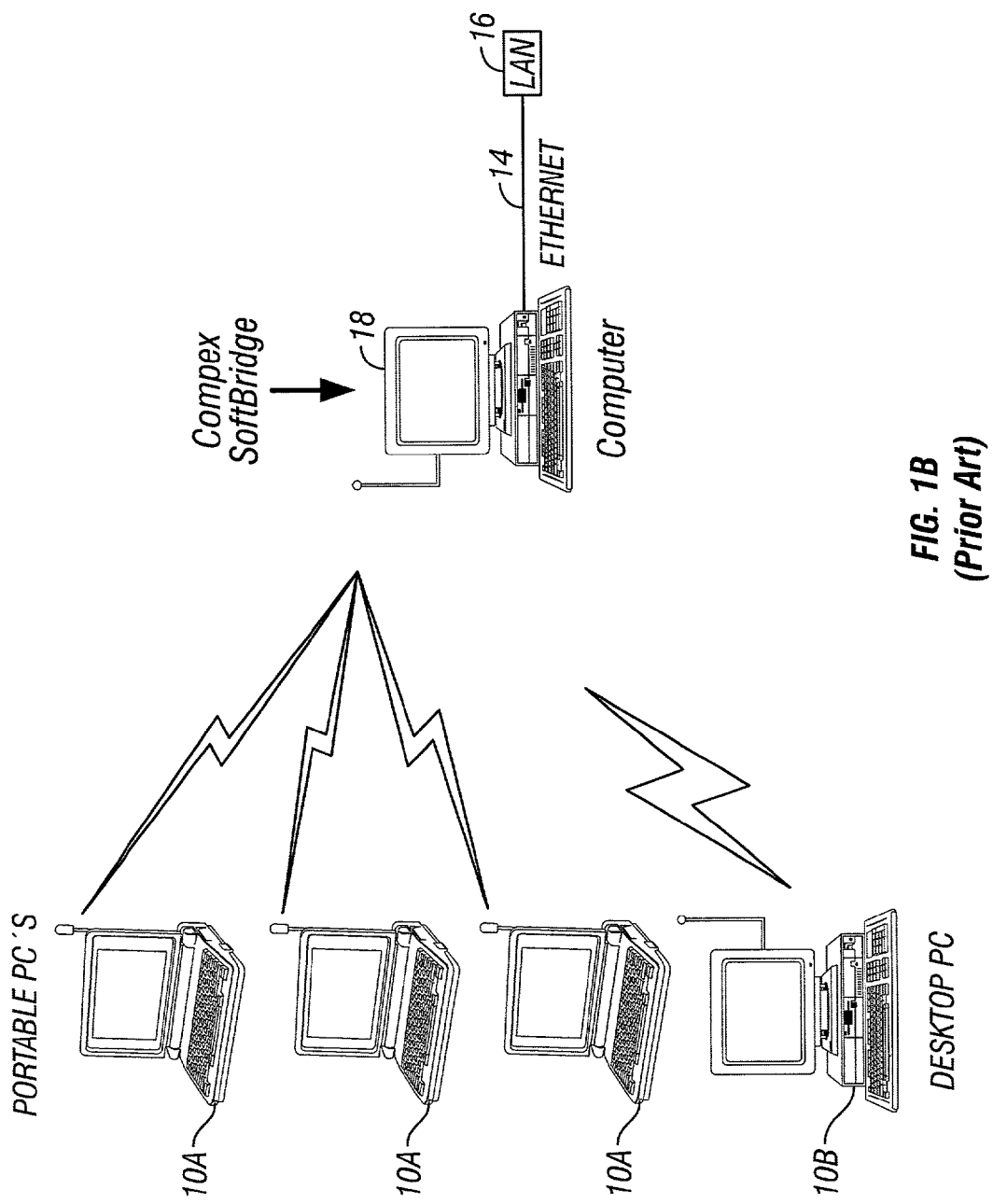
FIG. 1B (prior art) illustrates communication with a prior art wireless access point to a LAN network using a PC and Compex software and components.
Figure 1C:
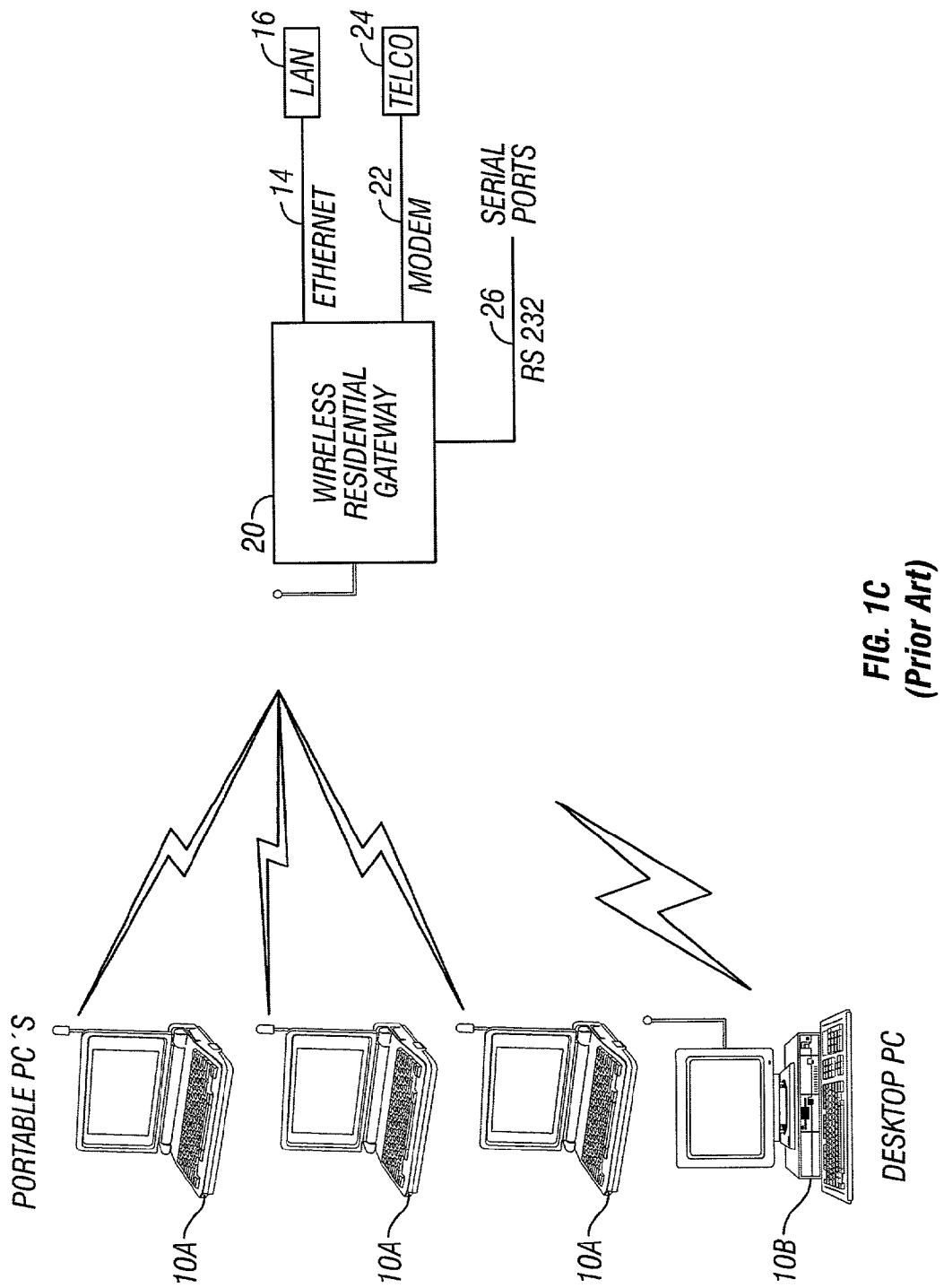
FIG. 1C (prior art) illustrates communication with a prior art wireless gateway.
Figure 1D:
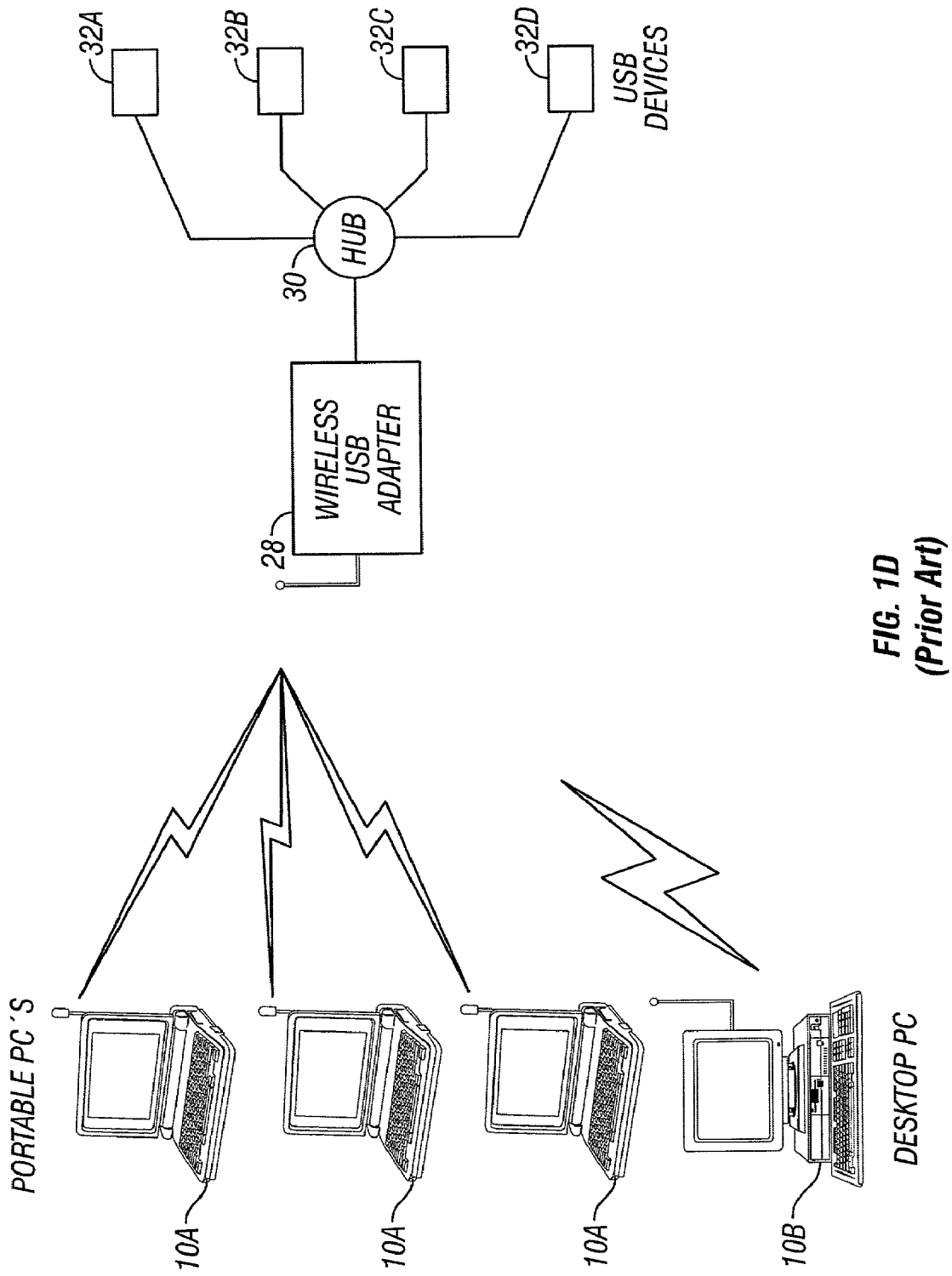
FIG. 1D (prior art) illustrates communication with a prior art wireless USB adapter and network.
Figure 1E:
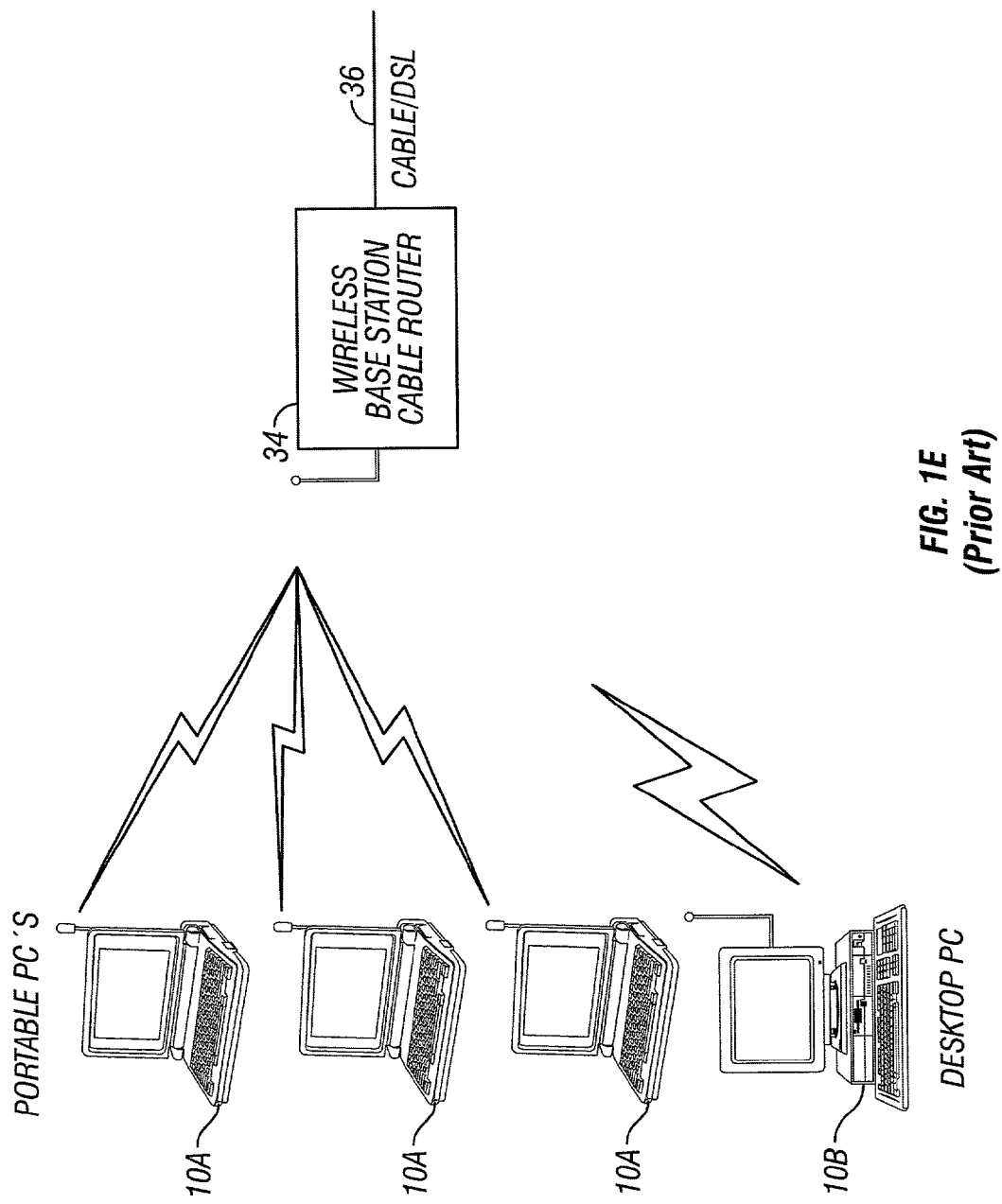
FIG. 1E (prior art) illustrates a communication with a prior art wireless base station connected to cable or DSL lines.
Figure 1F:
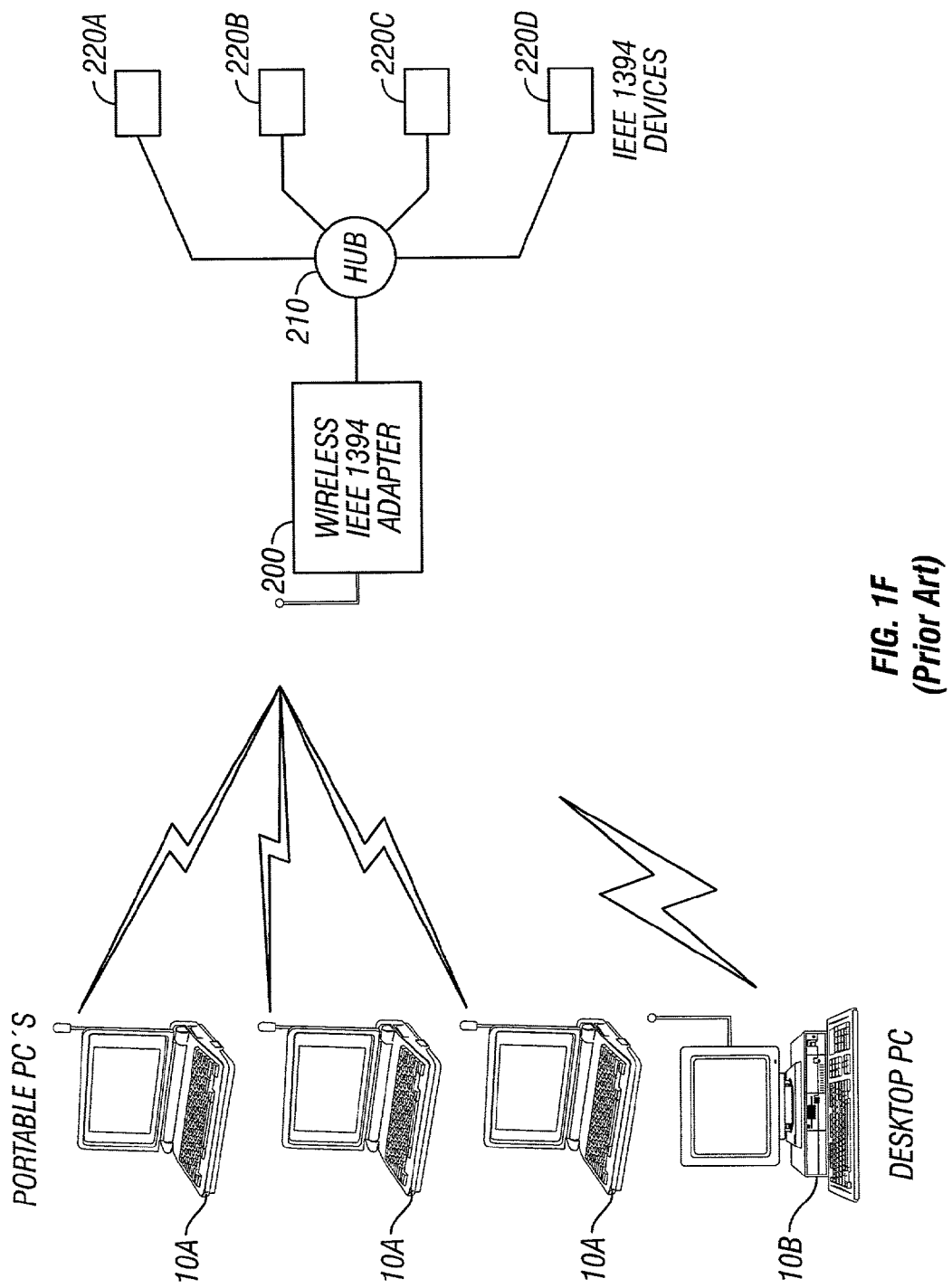
FIG. 1F (prior art) illustrates a product that provides wireless communication between users 10 and a IEEE 1394 (Fire Wire) based network.
Figure 2:
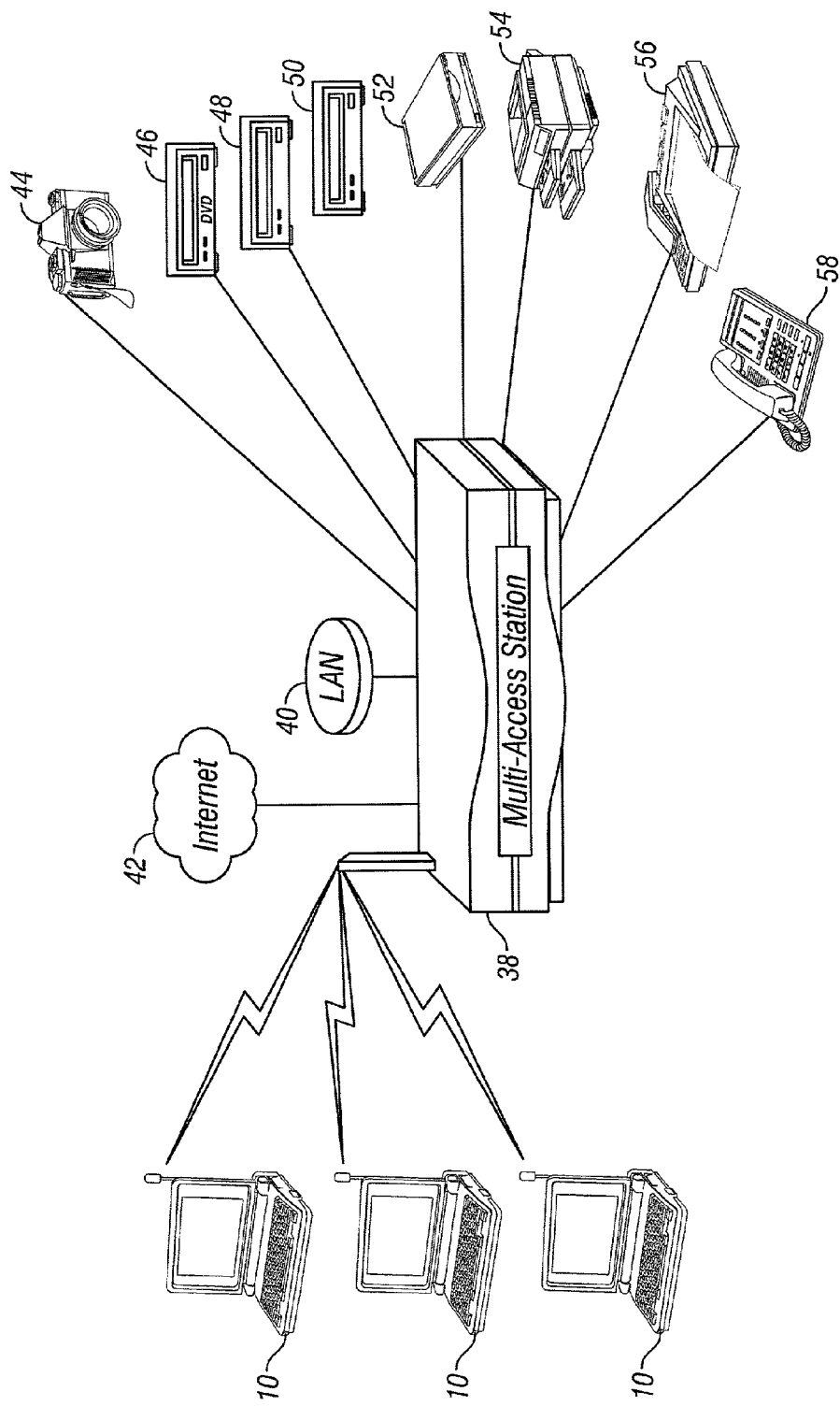
FIG. 2 is a pictorial representation of a flexible peripheral access router according to an embodiment of the present invention.

FIG. 2 is a pictorial representation of the present invention. Users gain access to the peripheral access router 38, or local area network router 38, via wireless modems in computers 10. Users may also access router 38 through the Internet 42 or LAN 40. Connected to router 38 are a number of peripheral devices 44-58. These include but are not limited to cameras 44, digital video disk (DVD) player 46, compact disk read/writer (CD-R/W) 48, storage hard drive 50, scanner 52, printer 54, copier 56, and telephone 58. Other devices are not specifically listed above can also be connected to router 38. Peripheral devices 44-58 communicate with router 38 via well established protocols 60 such as 802.11b (for wireless communication), universal serial bus (USB), Ethernet, IEEE 1394 (Fire Wire), line printer port (LPT), digital subscriber line (DSL), telephone lines, video cable, and small computer system interface (SCSI). Other protocols not specifically mentioned may also be used.

Figure 3A:
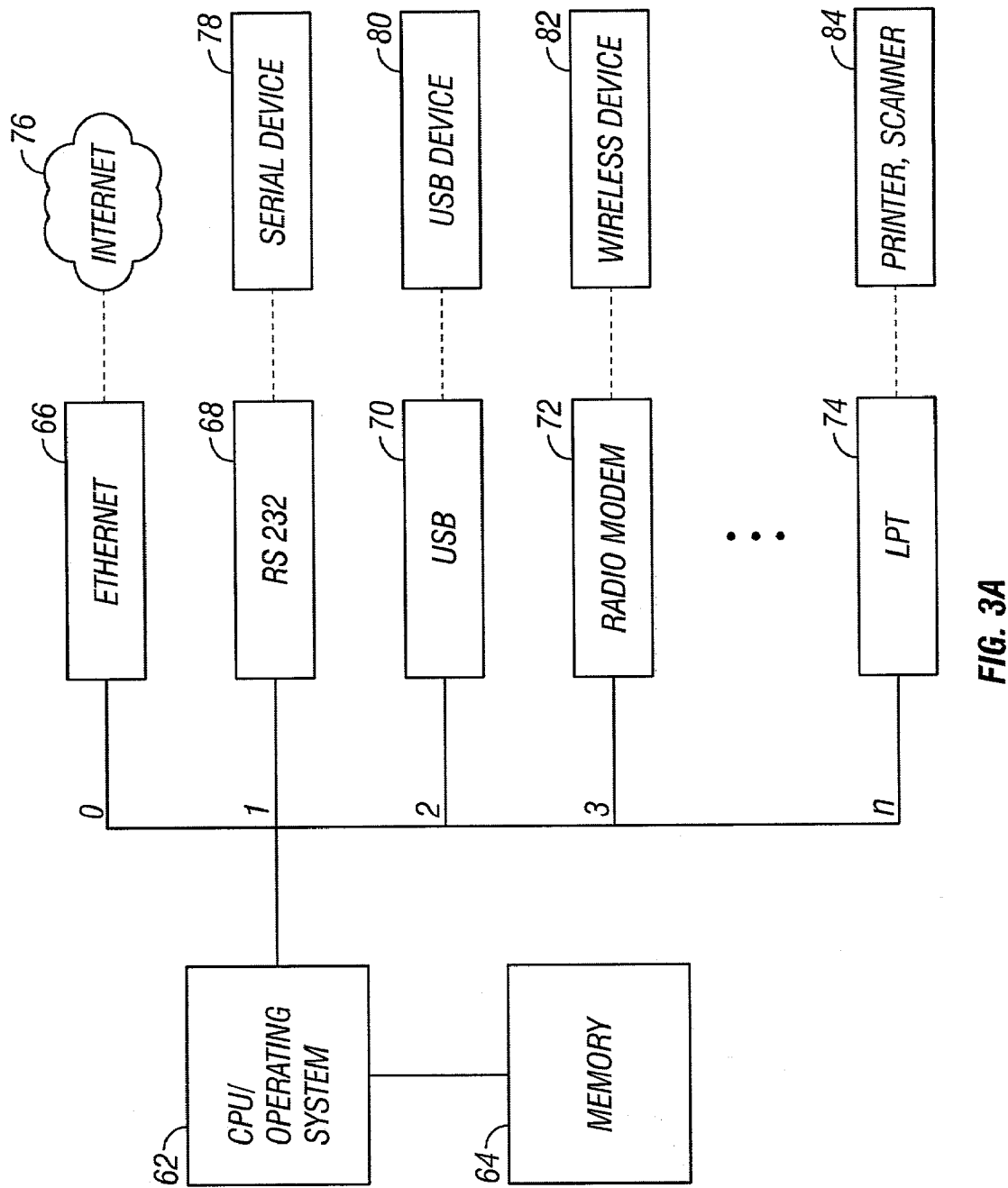
FIG. 3A is a block diagram of the peripheral access router according to an embodiment of the present invention.

FIG. 3A is a block diagram of the peripheral access router according to an embodiment of the present invention. Central processing unit 62 communicates with each peripheral device via port numbers 0, 1, 2, 3 . . . N, providing N+1 total ports. Information (see FIG. 3B) stored in memory 64 provides a unique IP address for each of the peripheral devices 76-84. Each local interface is assigned a unique port number, as illustrated in FIG. 3A. Each peripheral device has a unique IP address. The CPU 62 access saved information relating each peripheral's IP address to the port and local interface the device is connected to, sending packets of information destined for a particular peripheral to the correct port and interface. For example, incoming information, in the form of an IP packet, destined for serial device 78 (via its IP address) is routed to the interface circuit 68, providing the RS232 protocol. The incoming IP packet with the appropriate IP address is router to port number 1 by the central processing unit 62, which determines the appropriate port number via information stored in memory 64. Local interface 68 converts the IP packet into a suitable forma consistent with the protocol required to communicate with the serial device 78.

The local interfaces 66-74 may also contain IP address identification information that would allow multiple peripheral devices designed to be connected to a single local interface to be identified and utilized. In the example above, serial device 78 may be a modem or a printer. The modem and printer each have a unique IP address to allow CPU 62 to communicate with the serial device currently connected. Some interfaces, such as USB, Ethernet, and SCSI allow multiple peripheral devices to be connected simultaneously. For multiple USB devices 80 on a USB interface 70, information being sent to devices on the USB bus is sent to individual components via unique IP addresses. In this case, multiple IP addresses would be routed to port number 2 through interface 70. Local interface 70 would convert the IP packets to USB compatible protocol, and route the information to the appropriate target peripheral utilizing the IP address associated with the packet.

Figure 3B:
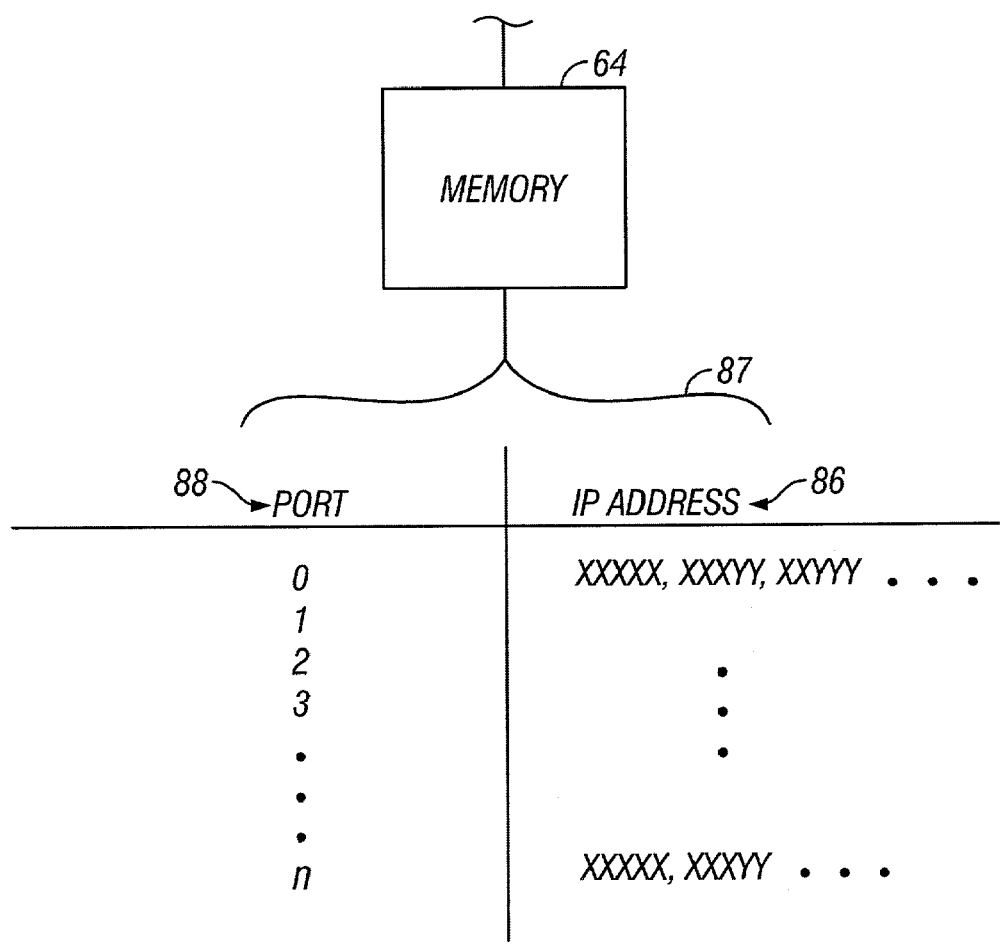
FIG. 3B is a schematic diagram illustrating the port and IP address relationships stored in memory in accordance with one embodiment of the present invention.

FIG. 3B is a schematic diagram illustrating the port and IP address relationships stored in memory in accordance with one embodiment of the present invention. A table 87 of IP addressed 86 as a function of port number 88 is stored as a simple look up table in memory 64. For each port number, a unique IP address corresponding to each device installed on that port is saved in memory. When a peripheral device is changed or added, the new IP address is added to table 87 (for the appropriate port number). For devices that are removed, the old address is removed (or marked inactive). In this manner, the CPU and system software always knows the current peripheral device configuration. The IP addresses of new devices may be provided as part of the installation process by the device being installed, or through configuration files previously stored in memory 64.

Figure 4:
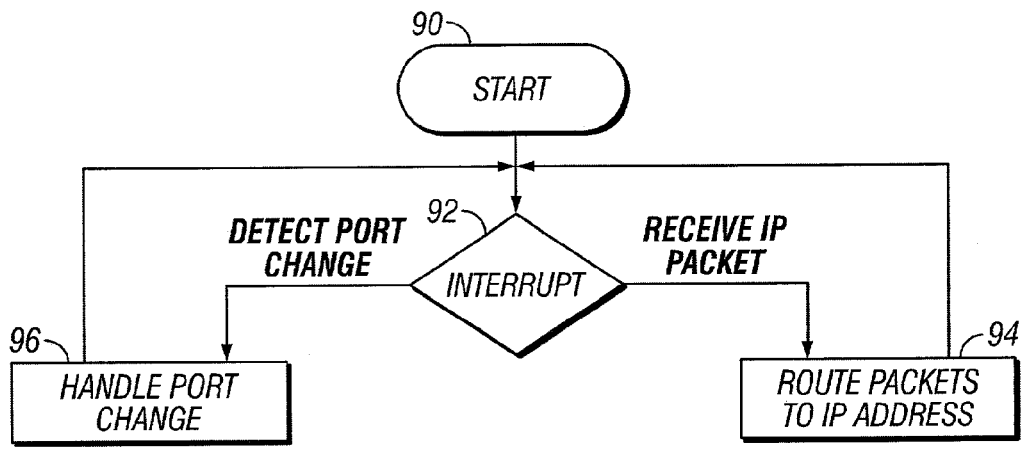
FIG. 4 is a flow diagram of a method for receiving incoming EP packets and addressing port changes according to an embodiment of the present invention.
Figure 5:
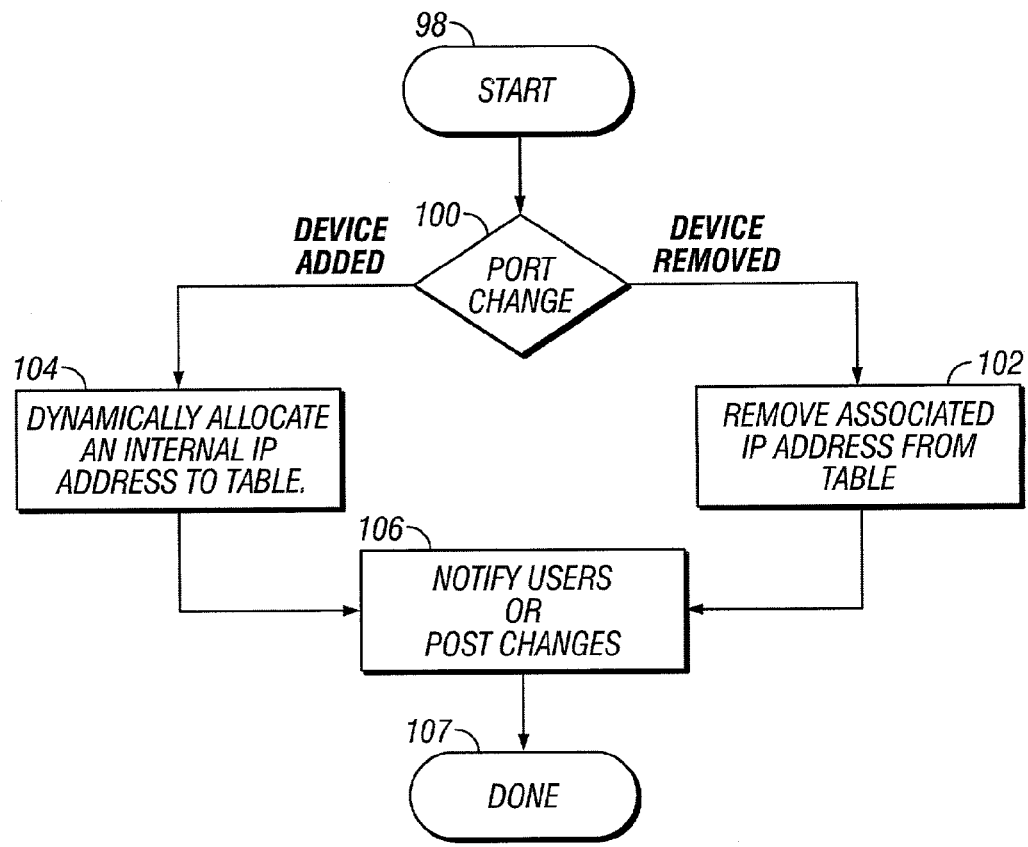
FIG. 5 is a flow diagram illustrating the "Handle Port Changes" process of FIG. 4 in greater detail.
Figure 6:
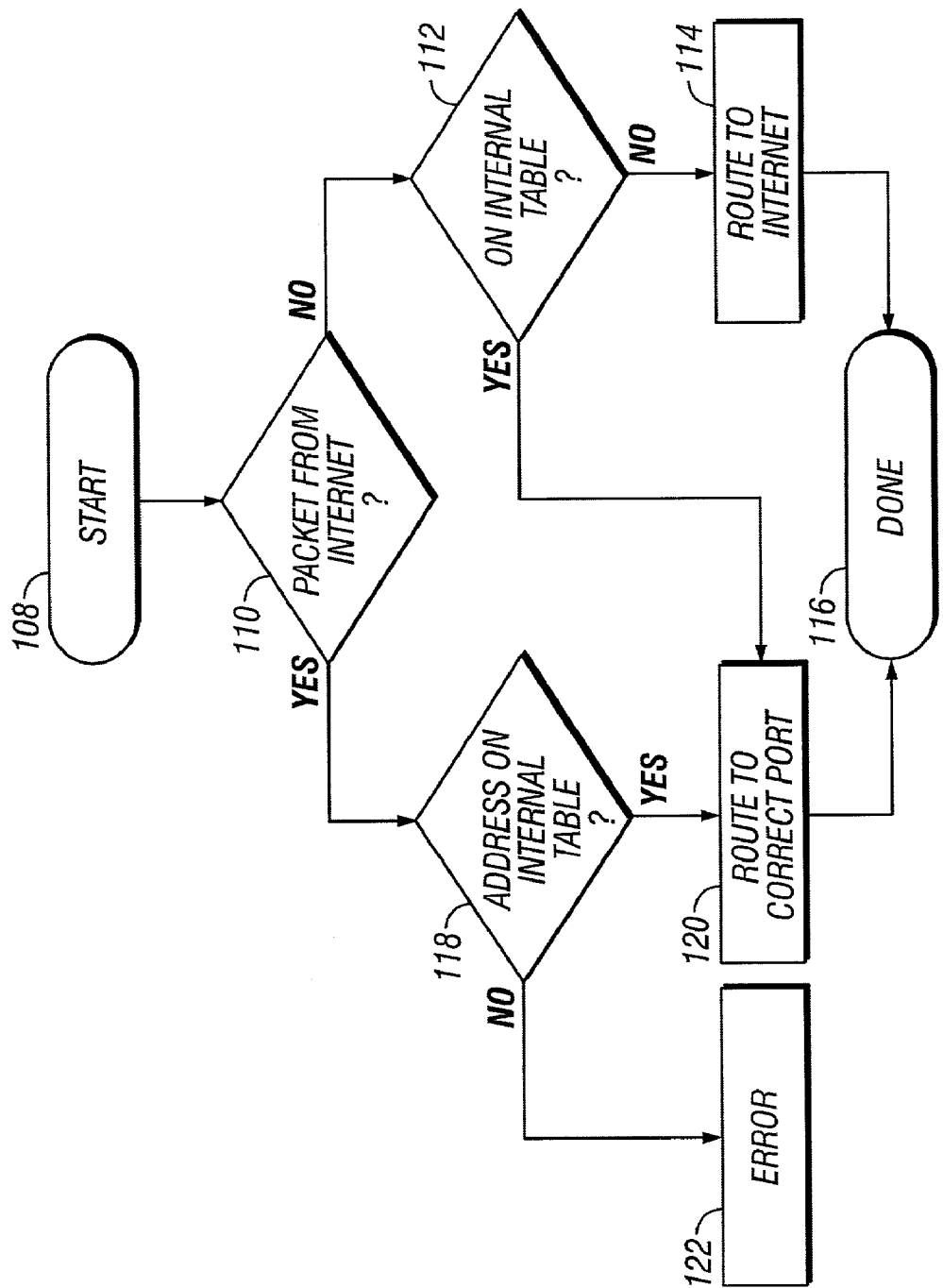
FIG. 6 is a flow diagram illustrating the "Route Packets" process of FIG. 4.

The process for routing packets and handling port changes begins as shown in FIG. 4. An interrupt is created in step 92 with a receiving an IP packet event or with a detecting a port change event. It is desirable to detect port changes so that the configuration of the router 38 is known at all times, as well as allowing for changes to be made to the number and type of peripheral devices, without having to shut down and re-boot. I.e., the present invention permits "hot swapping" of ports and devices. If an interrupt is created due to a port change, step 96 is executed. Further detail on step 96 is shown in FIG. 5. For interrupts created through receipt of an IP packet, step 94 is executed. Further detail on step 94 is shown in FIG. 6. Following processing of the interrupt 92 via steps 94 or 96, the system is returned to the start 90.

FIG. 5 illustrates further details of step 96, FIG. 4. Starting at step 98, one determines the type of port change in step 100. If a device is added, step 104 is executed in which the system dynamically allocates an internal IP address, and stores the new address in the table 86. Following step 104, the users are notified of the changes, or they are posted in a common area in step 106. If a device is added, step 104 is executed in which the system dynamically allocates an internal IP address, and stores the new address in the table 86. Following step 104, the users are notified of the changes, or they are posted in a common area in step 106. If a device is removed, the associated IP address is removed in step 102, following which users are notified of the change step 106. This process is applicable to the removal, replacement, or addition of peripheral devices. For the removal of a device, one would proceed from step 98 to 100 to 102 to 106 and 107. For the replacement of one device with another, one would first proceed from steps 98 to 100 to 102 to 106 and 107, followed by steps 98 to 100 to 104 to 106 and 107. For the addition of another device on the same port (i.e. for USB, SCSI, etc.) steps 98 to 100 to 104 to 106 and 107 would be followed.

It should also be noted that this process is applicable for introducing changes in the local interfaces as well. For example, if one were to remove the RS232 serial interface 68 and any serial device 78 attached thereto from port 1 in FIG. 3A, and replace these with a second Ethernet interface and LAN devices, one would follow the steps outlined above. That is, first the serial devices would be removed, including the local interface 68 (steps 98, 100, 102, 106 and 107). Then the Ethernet devices would be added, including the new Ethernet local interface (steps 98, 100, 104, 106 and 107). The IP addresses of the serial devices on port 1 would be deactivated and those of the Ethernet devices would be enabled. This allows peripheral with different protocols to be utilized on the same port, if desired (but not simultaneously, of course).

FIG. 6 is a flow chart of the packet routing step 94 of FIG. 4. From the starting step 108, step 110 determined if the packet is entering the router from the Internet. If not, process flow is routed to step 112, where the IP address is compared to those stored in table 86. If a match is found, step 120 is executed, and the information is routed to the appropriate port address 88. If no match is found, step 114 is executed, routing the packet to the Internet. Returning to step 110, if the packet is from the Internet, step 118 is executed, where the IP address is compared to those stored in table 86. If a match is found, the information is routed to the correct port 88 in step 120. If no match is found in step 122, an error is created in step 122. For the case of an erroneous IP address generated from an internal user, the process would proceed from step 110 to 114. Since no valid address would be found on the Internet, the IP packet would be returned. Process flow at step 110 would proceed to step 118 and then finally to step 122.

Figure 7:
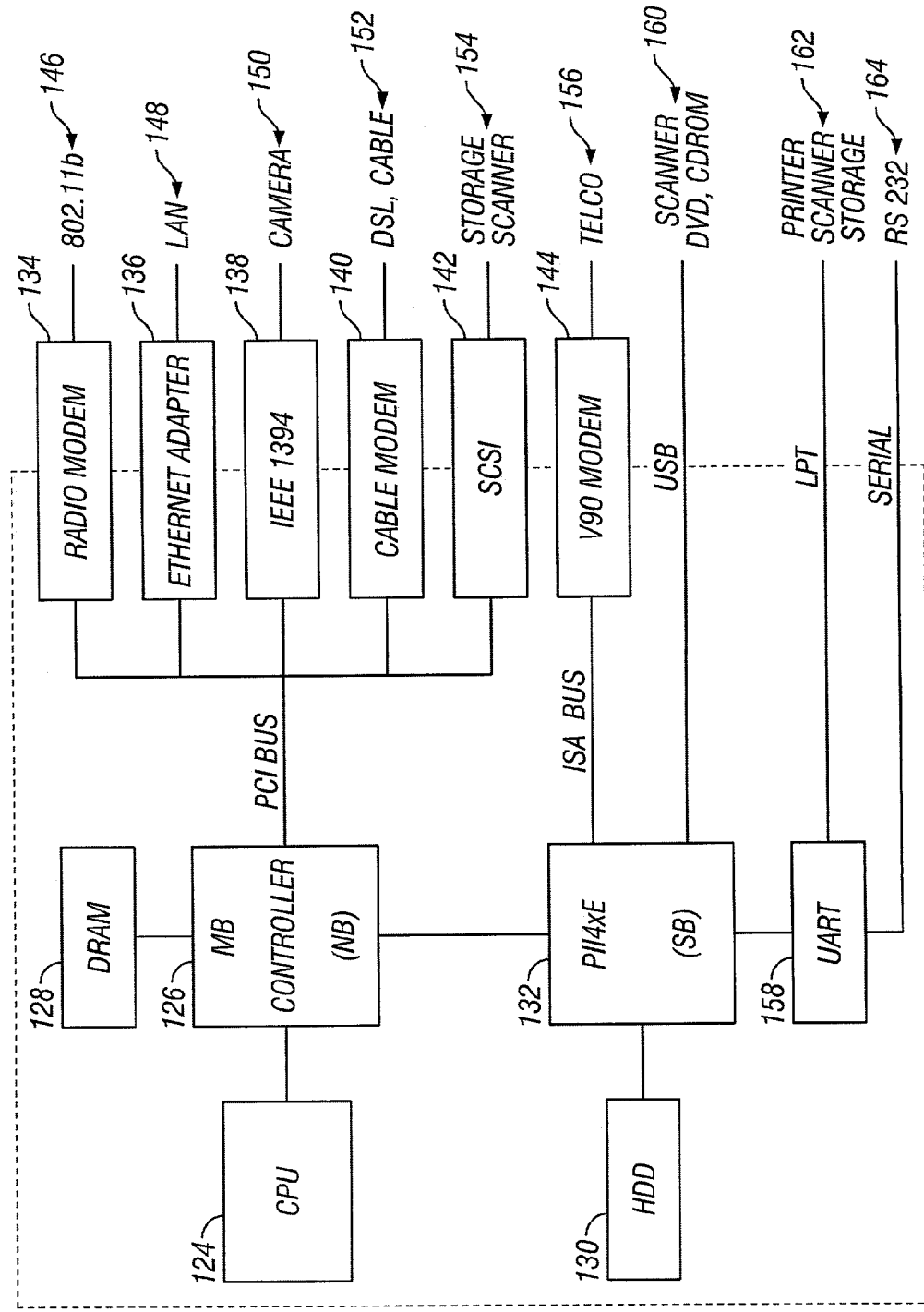
FIG. 7 is a block diagram of an illustrative embodiment of the present invention.

An exemplary hardware embodiment of the current invention utilizing a personal computer is shown in FIG. 7. Central processing unit (CPU) 124 is connected to motherboard controller 126. The motherboard controller 126 is connected by a bus system to DRAM 128, and to peripheral device interface circuit cards 134-142 via the PCI bus. Also connected to controller 126 are PIIX4e controller 132. Device 132 controls the system hard drives 120, as well as providing USB communication capability, and control the ISA bus. A V.90 modem 144 may be connected to the ISA bus. Also connected to device 132 is universal asynchronous receiver transmitter (UART) 158 that provides parallel port (LPT) and serial port (RS232) support. It should be noted that local interfaces such as USB, serial RS232, LPT can also be provided by additional circuitry on the PCI bus as well. The peripheral device interface circuit cards 134-144, along with devices 132 and 158, contain the hardware functionality of local interfaces 66-74 described previously that determine the peripheral device protocols.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded as illustrative rather than restrictive.

What is claimed is:

1. A local area network router comprising:
   a multi-access station enclosure;
   a central processing apparatus included within the enclosure;
   wherein the central processing apparatus is configured to connect to a plurality of peripheral devices coupled through wired connections to said central processing apparatus, and wherein the central processing apparatus is configured to provide each of said plurality of peripheral devices with an IP address;
   an Internet interface within the enclosure coupled to said central processing apparatus to provide Internet connectivity to one or more peripheral devices;
   wherein a first local interface included in the enclosure with the central processing apparatus is provided to couple to a first peripheral device of said plurality of peripheral devices and a second local interface included in the enclosure with the central processing apparatus is provided to couple to a first peripheral device of said plurality of peripheral devices, said first local interface of a type different from a type said second local interface and the type of each of said first local interface and said second local interface selected from a group of local interfaces consisting essentially of USB (Universal Serial Bus), IEEE 1394, RS-232, LPT (line printer port), DSL (digital subscriber line), SCSI (small computer system interface), Ethernet, video cable, optical cable and telephone line;

wherein remote users access said peripheral devices by using said IP address through said central processing apparatus;

and wherein said first local interface is removable from said enclosure of said local area network router and said second local interface is removable from said enclosure of said local area network router, wherein said first local interface and said second local interface each may be replaced by a third local interface during operation of said local area network router, said third local interface, upon placement in said enclosure, is coupled to said central processing apparatus and said third local interface, and said third local interface selected from a group of local interfaces consisting essentially of USB (Universal Serial Bus), IEEE 1394, RS-232, LPT (line printer port), DSL (digital subscriber line), SCSI (small computer system interface), Ethernet, video cable, optical cable and telephone line.

2. A local area network router as recited in claim 1:
wherein said plurality of peripheral devices are each coupled to at least one of a plurality of local interfaces, said at least one of a plurality of local interfaces being coupled to said central processing apparatus and integrated with said central processing apparatus, said plurality of local interfaces including said first local interface and said second local interface; and
wherein said plurality of peripheral devices communicate with said at least one of a plurality of local interfaces using peripheral interface protocols.

3. A local area network router as recited in claim 2:
wherein at least one of said plurality of local interfaces is wireless.

4. A local area network router as recited in claim 2:
wherein said at least one of a plurality of local interfaces is selected from a group consisting of:
(a) a universal serial bus (USB) port
(b) a RS 232 serial port
(c) an IEEE 1394 Fire Wire port
(d) a line printer terminal (LPT) port
(e) a small computer system interface (SCSI) port
(f) an Ethernet port
(g) a digital subscriber line (DSL) port
(h) a video cable port
(i) a V.90 telephone line modem port and
(j) an optical fiber port.

5. A local area network router as recited in claim 1:
wherein said at least one of a plurality of peripheral devices is selected from a group consisting of:
(a) a camera
(b) a printer
(c) a scanner
(d) a copier
(e) a hard drive
(f) a CD-R/W drive
(g) a DVD drive/player
(h) a removable media storage device
(i) a streaming tape drive
(j) an Ethernet hub or router
(k) a telephone
(l) a modem
(m) a game controller
(n) a USB hub and
(o) an MPEG player.

6. A local area network router as recited in claim 2:
wherein said at least one of a plurality of local interfaces can be changed without re-booting said central processing apparatus.

7. A local area network router as recited in claim 1:
wherein said IP address of at least one of said plurality of peripheral devices is saved in memory.

8. A local area network router as recited in claim 1:
wherein a data packet with a destination IP address, originating from said Internet interface, is delivered to a device of the plurality of peripheral devices assigned said IP address.

9. A local area network router as recited in claim 2:
wherein a data packet with a destination IP address, originating from said at least one of a plurality of local interfaces, is delivered to a device of the plurality of peripheral devices assigned said IP address through said local interface, and wherein said local interface converts the data for one of said peripheral devices.

10. A method of operating a local area network router comprising:
detecting within the local area network router a data packet en route from a remote originating IP address to a destination IP address;
sending said data packet to a local interface within an enclosure of the local area network router coupled to a first peripheral device having said destination IP address if said destination address is on a list of local addresses;
translating by said first local interface said data packet into an appropriate protocol for said peripheral device;
and wherein at least a second peripheral device of a plurality of peripheral devices including the first peripheral device is coupled through a second local interface within an enclosure of the local area network router using a wired connection and at least a third peripheral device of said plurality of peripheral devices is coupled through a third local interface within an enclosure of the local area network router using a wired connection, a type of said second local interface different from a type of said third local interface and the type of each of said second local interface and said third local interface selected from a group of local interfaces consisting essentially of USB (Universal Serial Bus), IEEE 1394, RS-232, LPT (line printer port), DSL (digital subscriber line), SCSI (small computer system interface), Ethernet, video cable, optical cable and telephone line.

11. A method of operating a local area network router as recited in claim 10:
wherein said first local interface is selected from a group consisting of:
(a) a universal serial bus (USB) port
(b) a RS 232 serial port
(c) an IEEE 1394 Fire Wire port
(d) a line printer terminal (LPT) port
(e) a small computer system interface (SCSI) port
(f) an Ethernet port
(g) a digital subscriber line (DSL) port
(h) a video cable port
(i) a V.90 telephone line modem port and
(j) an optical fiber port.

12. A method of operating a local area network router as recited in claim 10:

wherein said first peripheral device is selected from a group consisting of:
(a) a camera
(b) a printer
(c) a scanner
(d) a copier
(e) a hard drive
(f) a CD-R/W drive
(g) a DVD drive/player
(h) a removable media storage drive
(i) an Ethernet hub or router
(j) a telephone
(k) a modem
(l) a game controller
(m) a USB hub and
(n) an MPEG player.

13. A method of operating a local area network router as recited in claim 10:
wherein said first local interface is wireless.

14. A method of operating a local area network router as recited in claim 10 comprising:
changing said first local interface to a fourth local interface without re-booting said local area network router, a type of said fourth local interface different from a type of said first local interface and the type of each of said first local interface and said fourth local interface selected from a group of local interfaces consisting essentially of USB (Universal Serial Bus), IEEE 1394, RS-232, LPT (line printer port), DSL (digital subscriber line), SCSI (small computer system interface), Ethernet, video cable, optical cable and telephone line.

15. A method of operating a local area network router as recited in claim 10 comprising:
changing said first peripheral device without re-booting said local area network router.

16. A method of operating a local area network router as recited in claim 15 further comprising:
removing said destination address of said first peripheral device from said list of local addresses after uncoupling said first peripheral device from said first local interface.

17. A method of operating a local area network router as recited in claim 15 further comprising:
adding a new destination address of a new peripheral device to said list of local addresses after coupling said new peripheral device to said first local interface.

* * * * *